United States Patent
Tseng

(10) Patent No.: US 8,704,133 B2
(45) Date of Patent: *Apr. 22, 2014

(54) SILVER-CONTAINING ANTISEPTIC WELDING FLUX FOR STAINLESS STEEL

(75) Inventor: Kuang-Hung Tseng, Kaoshiung (TW)

(73) Assignee: National Pingtung University of Science and Technology, Neipu Hsiang (TW)

( * ) Notice: Subject to any disclaimer, the term of this patent is extended or adjusted under 35 U.S.C. 154(b) by 494 days.

This patent is subject to a terminal disclaimer.

(21) Appl. No.: 13/051,028

(22) Filed: Mar. 18, 2011

(65) Prior Publication Data

US 2012/0234814 A1    Sep. 20, 2012

(51) Int. Cl.
  *B23K 35/02*    (2006.01)
(52) U.S. Cl.
  USPC .................................................... 219/145.22
(58) Field of Classification Search
  USPC ......... 148/22, 23, 24, 26; 219/50, 59.1, 60 R,
      219/61, 72, 74, 75, 121.11, 136, 137 R,
      219/137 WM, 145.1, 145.22, 146.1, 146.23,
      219/146.31, 146.32, 146.41, 146.52;
      75/302

See application file for complete search history.

(56) References Cited

U.S. PATENT DOCUMENTS

| | | | |
|---|---|---|---|
| 4,551,610 A * | 11/1985 | Amata | 219/146.3 |
| 6,664,508 B1 * | 12/2003 | Johnson et al. | 219/137 WM |
| 7,300,528 B2 * | 11/2007 | Crockett | 148/23 |
| 7,886,557 B2 * | 2/2011 | Anderson et al. | 62/272 |
| 2005/0199317 A1 | 9/2005 | Chou et al. | |
| 2008/0029185 A1 * | 2/2008 | Tseng et al. | 148/23 |
| 2008/0175748 A1 | 7/2008 | Pereira | |
| 2009/0320960 A1 | 12/2009 | Nishina et al. | |
| 2010/0059576 A1 | 3/2010 | Seelig | |

* cited by examiner

*Primary Examiner* — Dana Ross
*Assistant Examiner* — Joseph Iskra
(74) *Attorney, Agent, or Firm* — Alan Kamrath; Kamrath IP Lawfirm, P.A.

(57) ABSTRACT

A silver-containing antiseptic welding flux for stainless steel includes 0.1-0.5 wt % of silver, 30-54 wt % of silicon dioxide, 20-40 wt % of titanium dioxide, 10-20 wt % of chromium oxide, 5-20 wt % of molybdenum oxide, 5-10 wt % of molybdenum sulfide, and 5-10 wt % of halide.

2 Claims, 5 Drawing Sheets

SILVER-CONTAINING ANTISEPTIC WELDING FLUX FOR STAINLESS STEEL

BACKGROUND OF THE INVENTION

1. Field of the Invention

The present invention relates to an antiseptic welding flux for stainless steel and, more particularly, to a silver-containing antiseptic welding flux for stainless steel.

2. Description of the Related Art

Conventionally, stainless steel parts are joined together by arc welding including tungsten inert gas welding (TIG), metal inert gas welding (MIG), submerged arc welding (SAW), and flux cored arc welding (FCAW). In tungsten inert gas welding, a tungsten bar serves as an electrode, and an arc generated between the electrode and the stainless steel parts serves as a heat source for welding. During welding, inert gas is supplied from an arc welding torch to the portions of the stainless steel parts to be joined to avoid oxidization at the electrode, the welding pool, the arc, and the adjacent heated area such that the welding portion can smoothly harden and cool to form a weld pass. However, problems including insufficient penetration depth, non-uniform penetration depth, and/or formation of wild and shallow welding pool often occur when using the tungsten insert gas welding to form a weld pass with complete joint penetration in the stainless parts. This is due to minor change in the alloy element in the welding pool. Thus, it is an issue to increase the penetration depth in conventional tungsten inert gas welding for increasing the yield and assuring complete joint penetration.

FIGS. 1A, 1B, and 1C show pre-processing of two stainless steel parts for enhancing conventional tungsten inert gas welding and the cross sectional view of the stainless steel parts after welding. To eliminate the problem of formation of a wide, shallow welding pool, a side 11 of each stainless steel part 1 is milled by a cutter 2 to form a bevel face 12. A groove is formed at the butt joint of the bevel faces 12 of the stainless steel parts 1 for carrying out tungsten inert gas welding by using a welding rod 100 and an arc welding torch 3 forming the tungsten bar electrode. A weld pass 13 is formed after welding. However, formation of the bevel faces 12 increases the penetration depth of the weld pass 13 at the cost of increased processing difficulties, increased manufacturing costs, and longer processing time. Furthermore, the weld pass 13 has poor welding structure, poor joining strength, and an uneven top surface.

U.S. Patent Publication No. 2005/0199317 (Taiwan Patent Publication No. I231239) discloses a welding flux for use in arc-welding of stainless steel parts and a method of welding stainless steel parts using the welding flux. The welding flux consists essentially of over 70 wt % of manganese peroxide (the base material) and less than 30 wt % of at least one activator selected from a material group that includes zinc oxide, silicon dioxide, chromium oxide, titanium oxide, molybdenum dioxide, and iron oxide.

With reference to FIGS. 2A and 2B, when joining two stainless steel parts 1 using arc welding, a welding flux 4 containing the base material and the activator mentioned above is mixed in a liquid carrier to form a paste-like flux, and a thin layer of the paste-like flux is coated over the joint of the stainless steel parts 1 by a brush 40 to allow subsequent welding of the stainless steel parts 1 using an arc welding torch. A weld pass 13 is formed after arc welding. Since welding spatters are scarcely generated near the weld pass 13, the surface of the weld pass 13 is almost flush with the unmolten surfaces of the stainless steel parts 1. A wide, narrow, complete joint penetration is obtained at the weld pass 13 and can be seen from the cross sectioned sample of the weld pass 13.

With reference to FIGS. 3A and 3B, the welding quality is enhanced by adding the base material (manganese peroxide) and the activator, such that the welding flux 4 effectively improves the gradient change in the surface tension of the liquid, molten metal in the welding pool 10, which affects the flow of the liquid, molten metal in the welding pool 10. Specifically, the gradient change in the surface tension of the liquid, molten metal depends on the temperature coefficient of the surface tension of the welding pool 10 while the temperature coefficient depends on the presence of active elements.

With reference to FIG. 3A, in a case that there is no active element in the welding pool 10 (or the active element in the welding pool is less active), the surface tension of the welding pool 10 will decrease when the temperature of the arc generated by the arc welding torch 3 increases. The surface of the liquid, molten metal flows outward from a center of the welding pool 10 ("the exterior surface tension flow"). The weld pass 13 thus formed is wide and shallow. On the other hand, when active elements are present in the welding pool 10, the surface tension of the welding pool 10 will increase when the temperature of the arc increases. The surface of the liquid, molten metal flows inward towards the center of the welding pool 10 ("the interior surface tension flow"). The weld pass 13 thus formed is narrow and deep.

Although the conventional welding flux 4 contains activators (the active elements), the welding flux 4 is mostly manganese peroxide (the base material) that is of little help to activation. Furthermore, coating of the welding flux 4 on top of the sides 11 of the stainless steel parts 1 is troublesome and complicates the welding procedure. Further, the particle size of the powder welding flux 4 is large and, thus, difficult to coat, resulting in uneven thickness when the welding flux 4 is coated to the stainless steel parts 1 and leading to uneven penetration depth of the resultant welding pass.

Taiwan Patent Publication No. I297629 discloses a welding flux for stainless steel containing activators including titanium oxide (25-40 wt %), chromium oxide (25-30 wt %), silicon dioxide (10-30 wt %), molybdenum sulfide (10-30 wt %), and molybdenum oxide (5-15 wt %) to increase the penetration depth.

However, generation of welding spatters that are difficult to remove is liable to occur due to the high molybdenum sulfide content in the welding flux disclosed in Taiwan Patent Publication No. I297629, resulting in an uneven surface of the weld pass and in difficulties in cleaning. Furthermore, the costs of the welding wax are increased by some of the activators (such as chromium oxide) that are expensive and have a high percentage in the welding flux. Furthermore, the particle size of the powder welding flux is large and, thus, results in uneven thickness when the welding flux is coated to the stainless steel parts, leading to poor penetration, insufficient penetration depth, and insufficient depth/width ratio of the weld pass, easily causing deformation of the stainless steel parts.

Antiseptic stainless steel has been developed and is available on the market. However, the weld pass of the antiseptic stainless steel parts joined by the conventional welding fluxes suffers the disadvantages of poor penetration, insufficient penetration depth, and insufficient depth/width ratio of the weld path. Furthermore, the conventional welding fluxes contain no antiseptic ingredients such that the weld pass can not provide an antiseptic effect, failing to provide a thorough antiseptic effect after welding.

Thus, a need exists for an improved welding flux for stainless steel to enhance the welding quality of stainless steel parts.

SUMMARY OF THE INVENTION

An objective of the present invention is to provide a silver-containing antiseptic welding flux for stainless steel such that the weld pass formed is effectively antiseptic.

Another objective of the present invention is to provide a silver-containing antiseptic welding flux for stainless steel to reduce costs.

A further objective of the present invention is to provide a silver-containing antiseptic welding flux for stainless steel to enhance the surface smoothness of the weld pass.

Still another objective of the present invention is to provide a silver-containing antiseptic welding flux for stainless steel to improve coating and penetration of the welding flux.

Yet another objective of the present invention is to provide a silver-containing antiseptic welding flux for stainless steel to increase the penetration depth.

Still another objective of the present invention is to provide a silver-containing antiseptic welding flux for stainless steel to increase the depth/width ratio of the weld path.

Yet another objective of the present invention is to provide a silver-containing antiseptic welding flux for stainless steel with enhanced weldability.

Still another objective of the present invention is to provide a silver-containing antiseptic welding flux for stainless steel with enhanced corrosion resistance.

Yet another objective of the present invention is to provide a silver-containing antiseptic welding flux for stainless steel with enhanced mechanical strength.

Still another objective of the present invention is to provide a silver-containing antiseptic welding flux for stainless steel such that the weld pass formed has a smooth appearance.

The present invention fulfills the above objectives by providing a silver-containing antiseptic welding flux for stainless steel including 0.1-0.5 wt % of silver, 30-54 wt % of silicon dioxide, 20-40 wt % of titanium dioxide, 10-20 wt % of chromium oxide, 5-20 wt % of molybdenum oxide, 5-10 wt % of molybdenum sulfide, and 5-10 wt % of halide. The manufacturing costs for the antiseptic welding flux for stainless steel can be cut, and the depth/width ratio of the weld pass is increased.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1A:
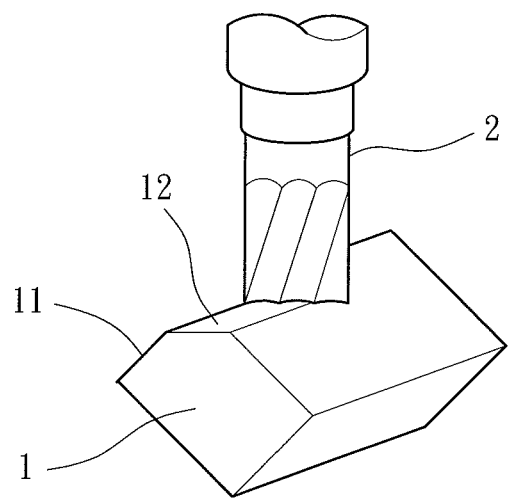
FIG. 1A shows pre-processing on a stainless steel part to be joined with another stainless steel part by conventional tungsten inert gas welding.
Figure 1B:
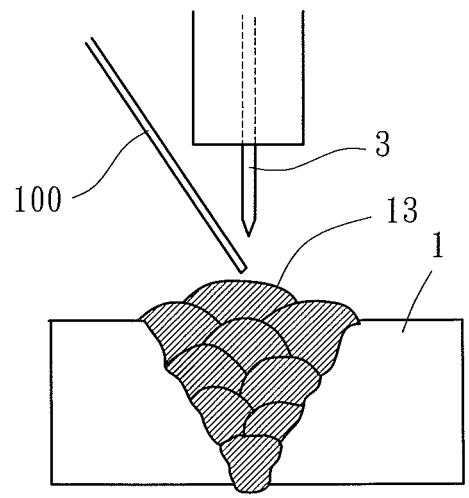
FIG. 1B shows a cross sectional view of two stainless steel parts being joined by conventional tungsten inert gas welding.
Figure 1C:
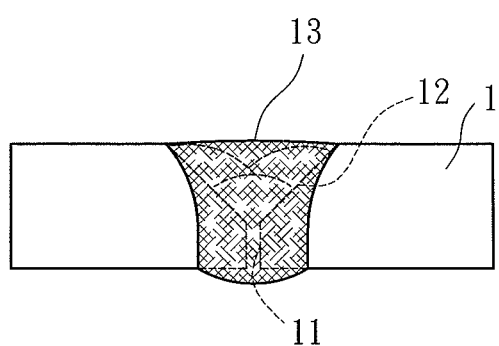
FIG. 1C shows the stainless steel parts of FIG. 1B after tungsten insert gas welding.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "side", "end", "annular", "outward", "inward", "width", "depth", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A silver-containing antiseptic welding flux for stainless steel according to the preferred teachings of the present invention includes silver (Ag), silicon dioxide ($SiO_2$), titanium dioxide ($TiO_2$), chromium oxide ($Cr_2O_3$), molybdenum oxide, molybdenum sulfide ($MoS_2$), and halide. The ingredients of the welding flux are of certain proportions, and the welding flux can be mixed with a welding material to proceed with joining of two stainless steel parts by arc welding with the advantages of increased penetration, enhanced weldability, enhanced surface smoothness of the weld path, enhanced mechanical strength, enhanced impact toughness, and an antiseptic effect of the weld pass.

The silver in the antiseptic welding flux for stainless steel according to the preferred teachings of the present invention provides the antiseptic effect and is preferably in the form of micro-scale silver particles. When the micro-scale silver particles approach germs such as viruses, fungus, bacteria, or bacteriophages, degradation of the proteases of the germs that requires oxygen to metabolize degrade. Due to malfunction of the proteases, the germs die from an inability to proceed with normal oxygen metabolism. Thus, the antiseptic welding flux for stainless steel according to the preferred teachings of the present invention provides the resultant weld pass with an antiseptic effect. Although an antiseptic effect for the welding flux for stainless steel can be enhanced by increasing the content of the silver, the content of the expensive sliver should be limited to control the overall cost.

The silicon dioxide enhances the welding characteristics for the stainless steel welding and aids in the increase of the penetration depth. Although the overall cost of the welding flux for stainless steel can be cut by increasing the content of the cheap silicon dioxide, the content of the silicon dioxide should be limited to avoid excessive welding slag. The titanium dioxide enhances the corrosion resistance of the weld pass and aids in the increase of the penetration depth. The chromium oxide enhances the mechanical strength and impact toughness for the stainless steel welding as well as aids in the increase of the penetration depth. The molybdenum oxide increases the penetration depth during stainless steel welding to increase the depth/width ratio of the weld pass, reducing the heat-affected zone during welding. The molybdenum oxide is preferably molybdenum trioxide ($MoO_3$). The molybdenum sulfide reduces the amount of welding slag on the appearance of the weld pass to enhance the surface smoothness of the weld pass, providing a pleasing appearance.

The halide increases the depth/width ratio of the weld pass. The halide is cheap and, thus, reduces the overall cost of the welding flux for stainless steel. Furthermore, the halide can reduce the slag on the appearance of the weld pass, providing the weld pass with a smooth surface. Even though slag is generated, it can be easily removed. The halide can be fluoride, chloride, bromide, or iodide. The halide is preferably fluoride such as magnesium fluoride or nickel fluoride. In preferred examples, the halide is magnesium fluoride.

Preferably, the silver-containing welding flux for stainless steel according to the preferred teachings of the present invention includes 0.1-0.5 wt % of silver, 30-54 wt % of silicon dioxide, 20-40 wt % of titanium dioxide, 10-20 wt % of chromium oxide, 5-20 wt % of molybdenum oxide, 5-10 wt % of molybdenum sulfide, and 5-10 wt % of halide. The manufacturing costs for the antiseptic welding flux for stainless steel can be cut, and the depth/width ratio of the weld pass is increased. The powdery particles of each element are preferably of a micro scale, such as 0.2-20 microns. It is appreciated that nano-scale metal particles can be produced through adjustment in processes to significantly enhance coating of the welding flux on the surfaces of the stainless steel parts as well as penetration. Enhanced coating of the welding flux allows uniform coating of the welding flux on the surfaces of the stainless steel parts, providing uniform penetration depth throughout the weld pass, increasing the depth/width ratio of the weld pass and, thus, reducing the risk of deformation of the stainless steel parts while having the antiseptic effect.

The silver-containing welding flux for stainless steel according to the preferred teachings of the present invention can be utilized in various arc welding processes for various stainless steel parts to enhance the overall welding quality. The stainless steel parts can be made of stainless steel meeting international standards including JIS, AISI, DIN, BS, and MIL, such as JIS SUS 304 austenitic stainless steel or JIS SUS 316 austenitic stainless steel. The arc welding can be tungsten inert gas welding (TIG), metal inert gas welding (MIG), submerged arc welding (SAW), and flux cored arc welding (FCAW). Examples A-I of tungsten inert gas welding of SUS 316 stainless steel using the welding flux for stainless steel according to the preferred teachings of the present invention will now be set forth. However, the welding flux for stainless steel according to the preferred teachings of the present invention is not limited to the examples A-I shown. Furthermore, the percentage of the ingredients of the welding flux and the welding material can be adjusted according to needs.

TABLE 1(a)

|  | A | B | C |
|---|---|---|---|
| silver (%) | 0.1 | 0.1 | 0.1 |
| $SiO_2$ (%) | 30 | 35 | 40 |
| $TiO_2$ (%) | 35 | 25 | 20 |
| $Cr_2O_3$ (%) | 20 | 14 | 10 |
| $MoO_3$ (%) | 5 | 12 | 10 |
| $MoS_2$ (%) | 5 | 7 | 10 |
| halide (%) | 5 | 7 | 10 |
| penetration depth | excellent | excellent | excellent |
| mechanical strength | excellent | excellent | good |
| corrosion resistance | excellent | excellent | good |
| weld pass appearance | good | excellent | excellent |
| weldability | good | excellent | excellent |
| percent of reduction of escherichia coli | 99.2% | 99.2% | 99.2% |
| percent of reduction of staphylococcus aureus | 99.2% | 99.2% | 99.2% |

TABLE 1(b)

|  | D | E | F |
|---|---|---|---|
| silver (%) | 0.3 | 0.3 | 0.3 |
| $SiO_2$ (%) | 30 | 35 | 40 |
| $TiO_2$ (%) | 35 | 25 | 20 |
| $Cr_2O_3$ (%) | 20 | 14 | 10 |
| $MoO_3$ (%) | 5 | 12 | 10 |
| $MoS_2$ (%) | 5 | 7 | 10 |
| halide (%) | 5 | 7 | 10 |
| penetration depth | excellent | excellent | excellent |
| mechanical strength | excellent | excellent | good |
| corrosion resistance | excellent | excellent | good |
| weld pass appearance | good | excellent | excellent |
| weldability | good | excellent | excellent |
| percent of reduction of escherichia coli | 99.6% | 99.6% | 99.6% |
| percent of reduction of staphylococcus aureus | 99.6% | 99.6% | 99.6% |

TABLE 1(c)

|  | G | H | I |
|---|---|---|---|
| silver (%) | 0.5 | 0.5 | 0.5 |
| $SiO_2$ (%) | 30 | 35 | 40 |
| $TiO_2$ (%) | 35 | 25 | 20 |
| $Cr_2O_3$ (%) | 20 | 14 | 10 |
| $MoO_3$ (%) | 5 | 12 | 10 |
| $MoS_2$ (%) | 5 | 7 | 10 |
| halide (%) | 5 | 7 | 10 |
| penetration depth | excellent | excellent | excellent |
| mechanical strength | excellent | excellent | good |
| corrosion resistance | excellent | excellent | good |
| weld pass appearance | good | excellent | excellent |
| weldability | good | excellent | excellent |
| percent of reduction of escherichia coli | ≥99.9% | ≥99.9% | ≥99.9% |
| percent of reduction of staphylococcus aureus | ≥99.9% | ≥99.9% | ≥99.9% |

Tables 1(a)-1(c) show the welding characteristics of examples A-I having differing ingredient percentages. It was found that the penetration depth was increased, the appearance of the weld pass was better, and the mechanical strength, corrosion resistance, weldability, and antiseptic effect were enhanced while significantly reducing the overall welding cost of stainless steel.

According to the regulations of JIS Z 2801-2000, the percent reduction of bacteria of any newly developed product is not less than 99%, and the percent reduction of bacteria (%)=(the bacteria count of a comparative product—the bacteria count of the newly developed product)/(the bacteria count of the comparative product).times.100. Since the definition of antiseptic effect is that the bacteria count after use of the antiseptic product is less than 1% of the bacteria count of the comparative product, the percent reduction of bacteria must be more than 99% for antiseptic effect. To examine the antiseptic effect, the bacteria selected were *escherichia coli* (BCRC 11634, ATCC 8739) and staphylococcus aureus (BCRC 12154, ATCC 6538 or BCRC 10451, ATCC 6538P). According to the test results, the percent reduction of bacteria at the surface of the weld pass was more than 99% for *escherichia coli* and staphylococcus aureus after tungsten inert gas welding of SUS 316 stainless steel using the welding flux for stainless steel according to the preferred teachings of the present invention, showing an excellent antiseptic function and a durable antiseptic effect.

The antiseptic rationale of the silver-containing welding flux for stainless steel is that the antiseptic silver ion can be released from the surface of the stainless steel weld pass and react with the bacteria on the surface of the weld pass to avoid metabolism of the bacteria and, thus, inhibit propagation of the bacteria. Furthermore, in the area where the silver ion is released, the corrosion resistance may degrade due to damage to the surface passive film. To obtain both an antiseptic effect and corrosion resistance, the antiseptic silver ion must be uniformly dispersed in the surface of the stainless steel weld pass.

FIGS. 4A, 4B, 4C, and 4D show first through fourth embodiments according to the teachings of the present invention. A welding material 101 is joined with a welding flux for stainless steel 102 to form a welding member (or a welding rod or a welding wire) 100. In the first embodiment shown in FIG. 4A, the welding flux for stainless steel 102 is filled in the hollow, cylindrical welding material 101. In the second embodiment shown in FIG. 4B, the welding flux for stainless steel 102 is coated around the cylindrical welding material 101. In the third embodiment shown in FIG. 4C, a sheet of welding material 101 is rolled into an annular form and envelopes the welding flux for stainless steel 102. In the fourth embodiment shown in FIG. 4D, a sheet of welding material 101 is rolled into an annular form and envelopes the welding flux for stainless steel 102. Furthermore, the welding material 101 includes at least one inwardly extending end 103 received in the welding flux for stainless steel 102. Furthermore, the welding material 100 includes at least one inwardly extending end 103 received in the welding flux for stainless steel 102.

Figure 5:
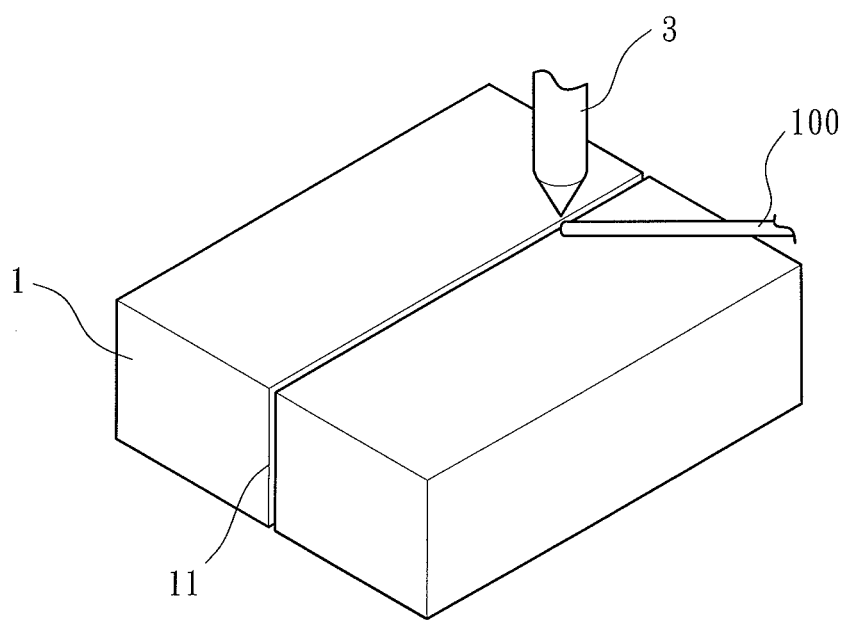
FIG. 5 shows a perspective view of two stainless steel parts to be joined by the welding rod utilizing the silver-containing antiseptic welding flux for stainless steel according to the preferred teachings of the present invention.

The ratio of the welding material 101 to the welding flux for stainless steel 102 according to the teachings of the present invention can be varied according to the types of the stainless steel parts and other needs. FIG. 5 shows arc welding of two stainless steel parts 1 utilizing the welding member 100 according to the teachings of the present invention. An arc welding torch 3 is moved to the vicinity of two mutually facing sides 11 of the stainless steel parts 1 under the protection of an inert gas such as argon, helium or a combination of argon and helium, providing the stainless steel parts 1 with arc heat to proceed with arc welding on the sides 11.

Figure 2A:
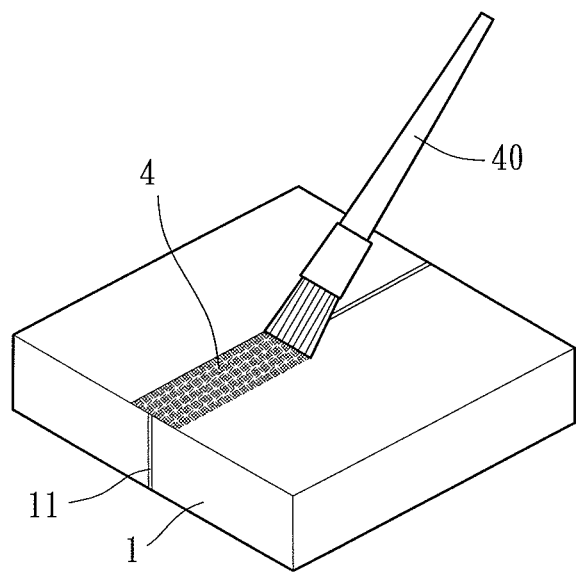
FIG. 2A shows pre-processing on two stainless steel parts to be joined by conventional arc welding.
Figure 2B:
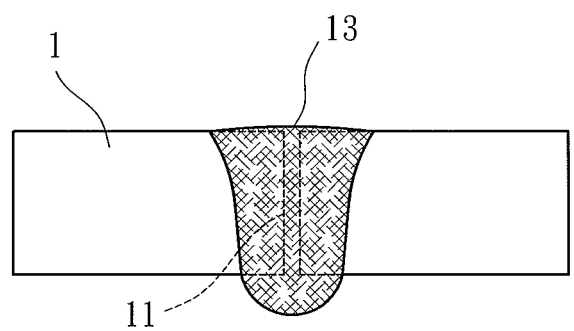
FIG. 2B shows a cross sectional view of the stainless steel parts of FIG. 2A after arc welding.
Figure 3A:
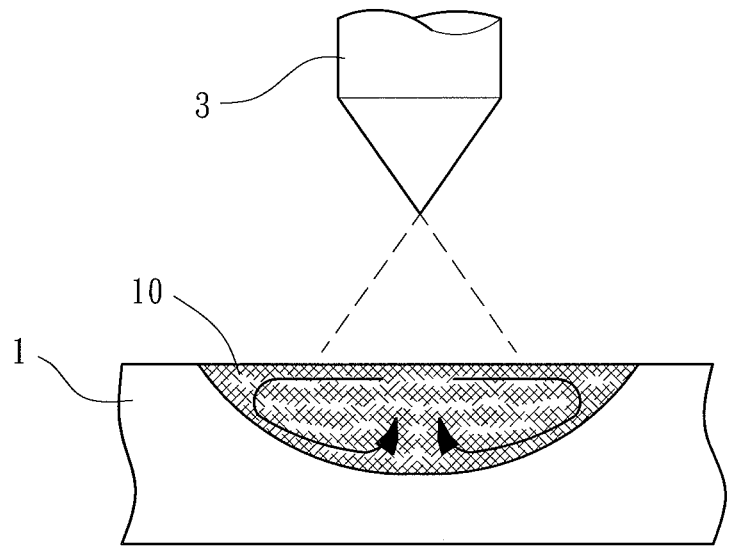
FIG. 3A shows a schematic side view of a stainless steel part, illustrating flow of molten metal in the welding pool during welding without using activators.
Figure 3B:
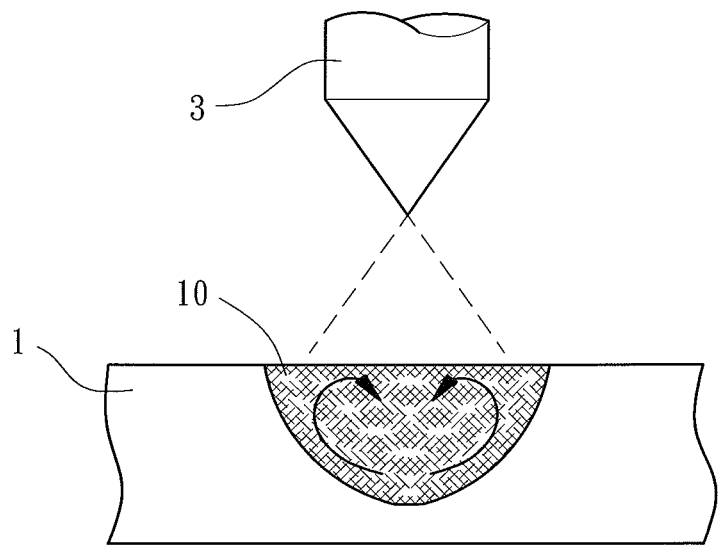
FIG. 3B shows a schematic side view of a stainless steel part, illustrating flow of molten metal in the welding pool during welding using activators.
Figure 4A:
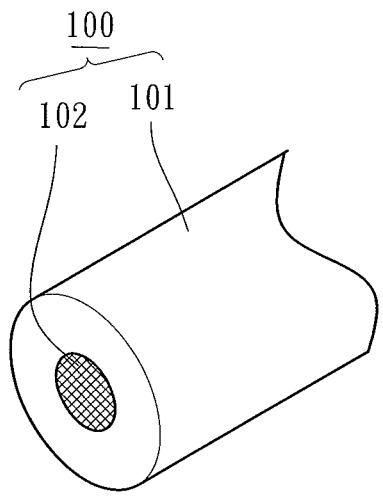
FIG. 4A shows a partial, enlarged, perspective view of a welding member utilizing a silver-containing antiseptic welding flux for stainless steel of a first embodiment according to the preferred teachings of the present invention.
Figure 4B:
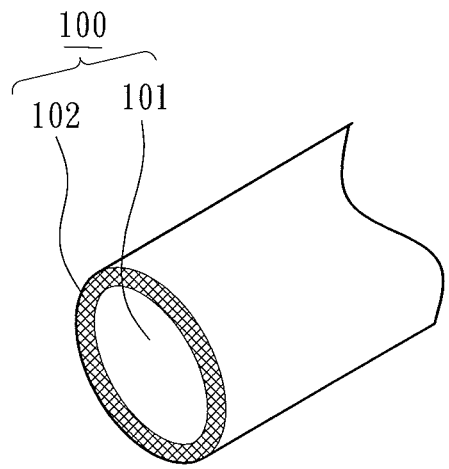
FIG. 4B shows a partial, enlarged, perspective view of a welding member utilizing a silver-containing antiseptic welding flux for stainless steel of a second embodiment according to the preferred teachings of the present invention.
Figure 4C:
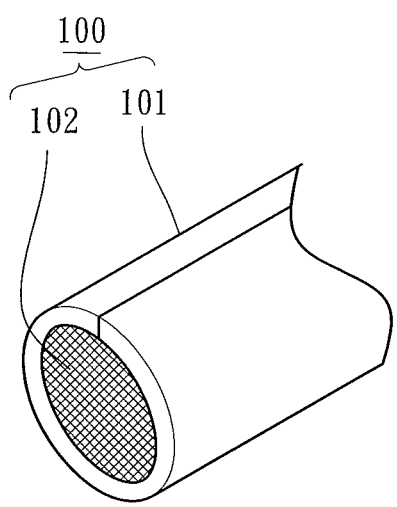
FIG. 4C shows a partial, enlarged, perspective view of a welding member utilizing a silver-containing antiseptic welding flux for stainless steel of a third embodiment according to the preferred teachings of the present invention.
Figure 4D:
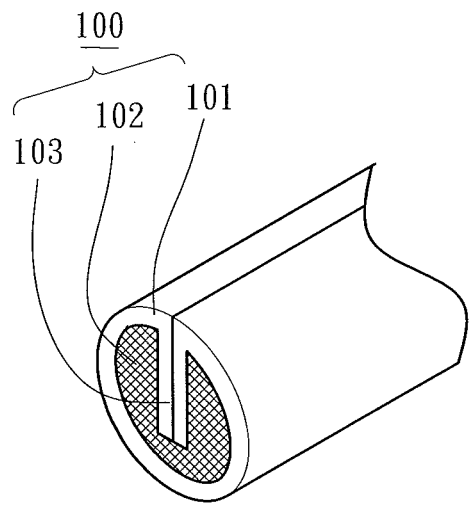
FIG. 4D shows a partial, enlarged, perspective view of a welding member utilizing a silver-containing antiseptic welding flux for stainless steel of a fourth embodiment according to the preferred teachings of the present invention.

The welding flux for stainless steel according to the preferred teachings of the present invention contains activators of suitable contents of silver, titanium oxide, chromium oxide, silicon dioxide, molybdenum oxide, molybdenum sulfide, and halide to effectively reduce the overall welding cost while effectively improving the gradient change in the surface tension of the liquid, molten metal in the welding pool 10 (cf. FIG. 2B and FIG. 3B), affecting the flow of the liquid, molten metal in the welding pool 10. With the assistance of the welding flux for stainless steel 102, the surface tension of the welding pool 10 will increase when the temperature of the arc increases. The surface of the molten metal flows inward towards the center of the welding pool 10 ("the interior surface tension flow"). Thus, the liquid, molten material in the welding pool 10 contracts such that the electric current density in the anode spot of the welding pool 10 increases, forming a narrow and deep weld pass 13. The depth/width ratio of the welding pool 10 is, thus, increased, reducing the heat-affected zone during welding and avoiding an adverse affect to the properties of the stainless steel adjacent to the welding area.

With reference to Tables 1(a)-1(c), by utilizing the welding flux for stainless steel 102 according to the teachings of the present invention containing several activators with different functions, the weld pass 13 of the stainless steel parts 1 has deep penetration and enhanced mechanical strength, enhanced impact toughness, enhanced weldability, and an antiseptic effect. Weld spatters are scarcely generated around the weld pass 13, and the surface of the weld pass 13 is almost flush with the surfaces of the stainless steel parts 1. Furthermore, the weld pass 13 has complete joint penetration with a smaller width between the stainless steel parts 1 according to the cross section of the weld pass 13. Pre-processing on the sides 11 of the stainless steel parts 1 is eliminated or mitigated. Furthermore, the welding flux for stainless steel 102 according to the teachings of the present invention can be joined with a welding material to form a welding member 100 (FIGS. 4A-4D), providing welding convenience and even supply of the welding flux for stainless steel 102.

Thus, the present invention provides a silver-containing antiseptic welding flux for stainless steel such that the weld pass formed is effectively antiseptic. Furthermore, the silver-containing antiseptic welding flux for stainless steel allows reduction of costs. Further, the silver-containing antiseptic welding flux for stainless steel enhances the surface smoothness of the weld pass and enhances coating and penetration of the welding flux. Further, the silver-containing antiseptic welding flux for stainless steel increases the penetration depth and the depth/width ratio of the weld path. Further, the silver-containing antiseptic welding flux for stainless steel is enhanced in weldability, corrosion resistance, and mechanical strength. Further, the weld pass formed by the silver-containing antiseptic welding flux for stainless steel has a smooth appearance.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A silver-containing antiseptic welding flux for stainless steel comprising 0.1-0.5 wt % of silver, 35 wt % of silicon dioxide, 25 wt % of titanium dioxide, 14 wt % of chromium oxide, 12 wt % of molybdenum trioxide, 7 wt % of molybdenum sulfide, and 7 wt % of halide being one of magnesium fluoride and nickel fluoride.

2. The silver-containing antiseptic welding flux for stainless steel as claimed in claim 1, including a plurality of powdery particles each having a diameter of 0.2-20 microns.

* * * * *